United States Patent [19]

Jensen

[11] Patent Number: 5,527,456
[45] Date of Patent: Jun. 18, 1996

[54] APPARATUS FOR WATER PURIFICATION BY CULTURING AND HARVESTING ATTACHED ALGAL COMMUNITIES

[76] Inventor: Kyle R. Jensen, 1168 Woodland Ter. Trail, Altamonte Springs, Fla. 32714

[21] Appl. No.: 893,246

[22] Filed: Jun. 2, 1992

[51] Int. Cl.$^6$ .............................. B01D 21/04; A01G 7/00
[52] U.S. Cl. ...................... 210/170; 210/242.1; 210/527; 210/241; 47/1.4; 47/59
[58] Field of Search .................................. 47/1.4, 59, 60, 47/65; 56/8, 9; 210/170, 241, 242.1, 242.3, 525, 527, 602, 776

[56] References Cited

U.S. PATENT DOCUMENTS

| | | | |
|---|---|---|---|
| 3,004,672 | 10/1961 | Conley et al. | 210/527 |
| 3,969,249 | 7/1976 | Dodd | 210/527 |
| 4,166,036 | 8/1979 | Barnhouser | 210/527 |
| 4,253,271 | 3/1981 | Raymond | 47/1.4 |
| 4,813,997 | 3/1989 | Kinnersley et al. | 47/1.4 |
| 5,197,263 | 3/1993 | Midtling et al. | 210/242.3 |
| 5,254,252 | 10/1993 | Drenner | 210/602 |

*Primary Examiner*—Thomas G. Wyse
*Attorney, Agent, or Firm*—Allen, Dyer, Doppelt, Franjola & Milbrath

[57] ABSTRACT

A floway for cleansing the water of a waterway containing nutrients and other pollutants, utilizing growing attached algal turf, the floway utilizing at least two elongate curbs spaced apart in a parallel relationship. A growing surface for algae is disposed between the curbs, on which growing surface, selected algae are caused to grow and form an algal turf able to bring about bioassimilation of nutrients and pollutants, as well as the physical trapping of particulates contained in water caused to flow over the algal turf. Water from the waterway is directed to flow through the floway and over the algal turf. A mobile harvester is provided for removing mature algal turf containing nutrients and pollutants assimilated and trapped by the algal turf, such harvester being of a width commensurate with the spacing of the curbs, so as to be supported therefrom. The harvester contains a vacuum pickup system, including an intake plenum for harvesting mature algal turf. Advantageously, the harvested algal turf is disposed of without permitting it to reenter the waterway. This floway may be a part of an algal farm made up of a number of floways disposed in a parallel array, with a barge being available to move the harvester from one floway to another, such that the mature algal turf in each floway can be effectively harvested.

43 Claims, 10 Drawing Sheets

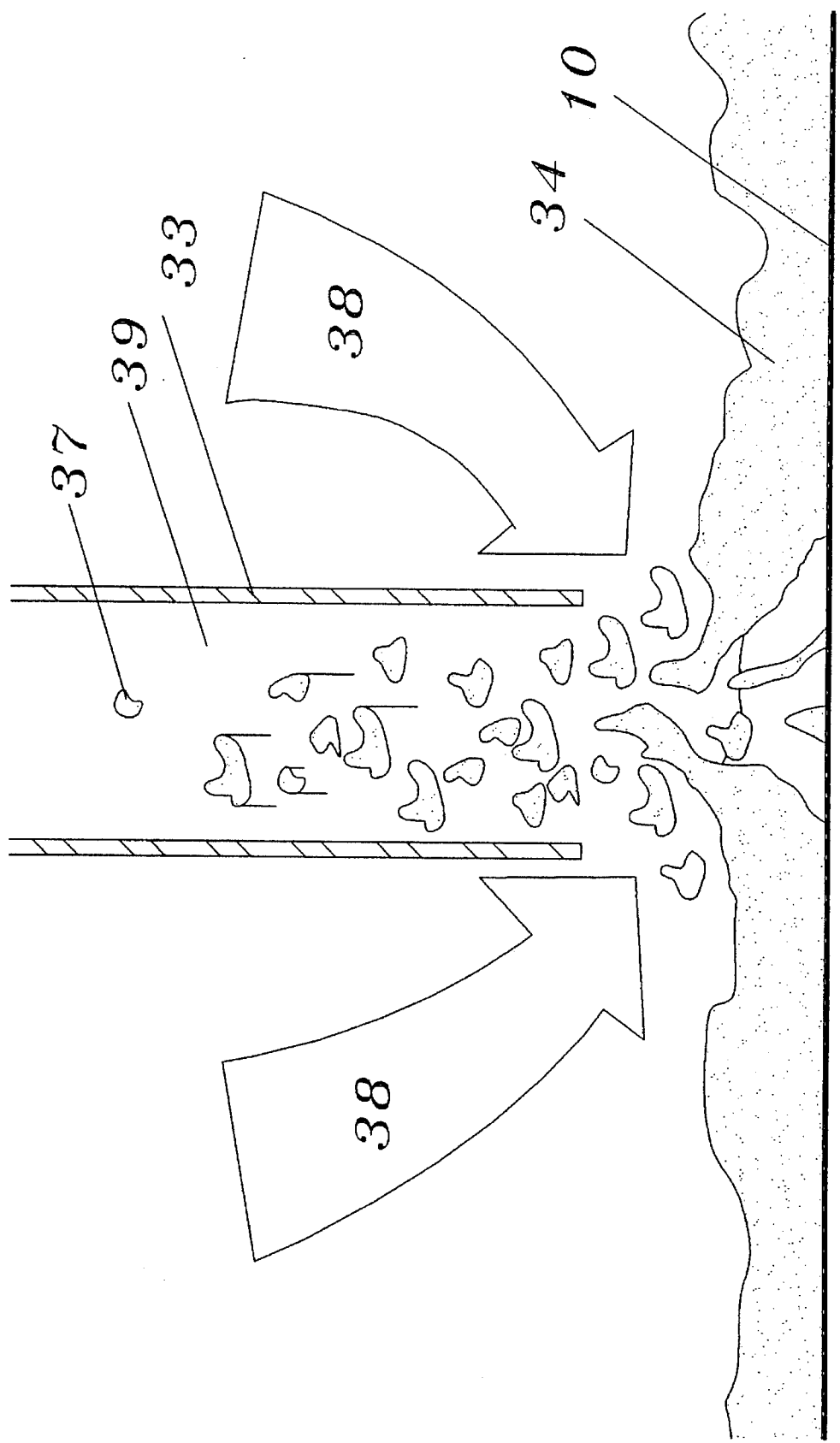

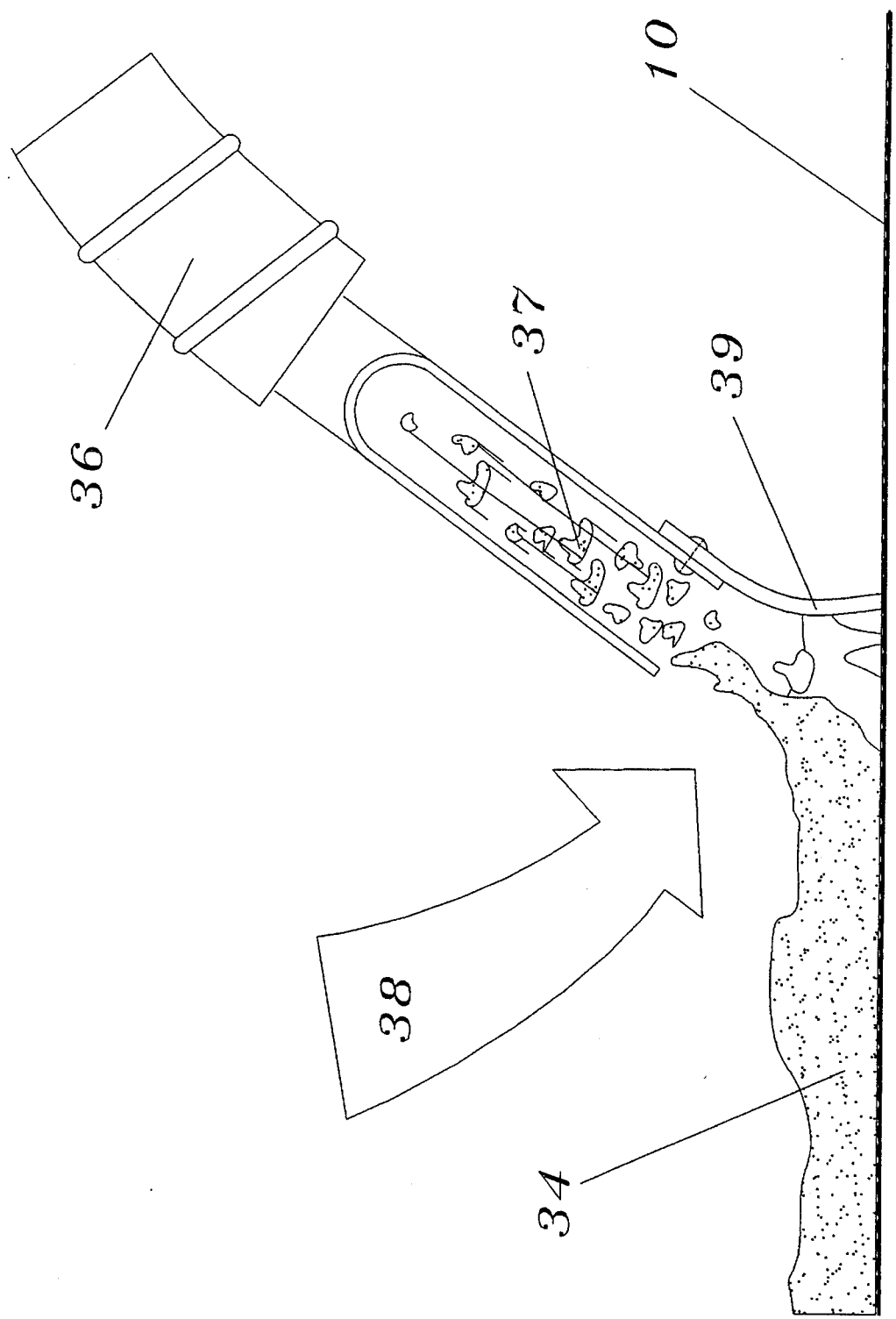

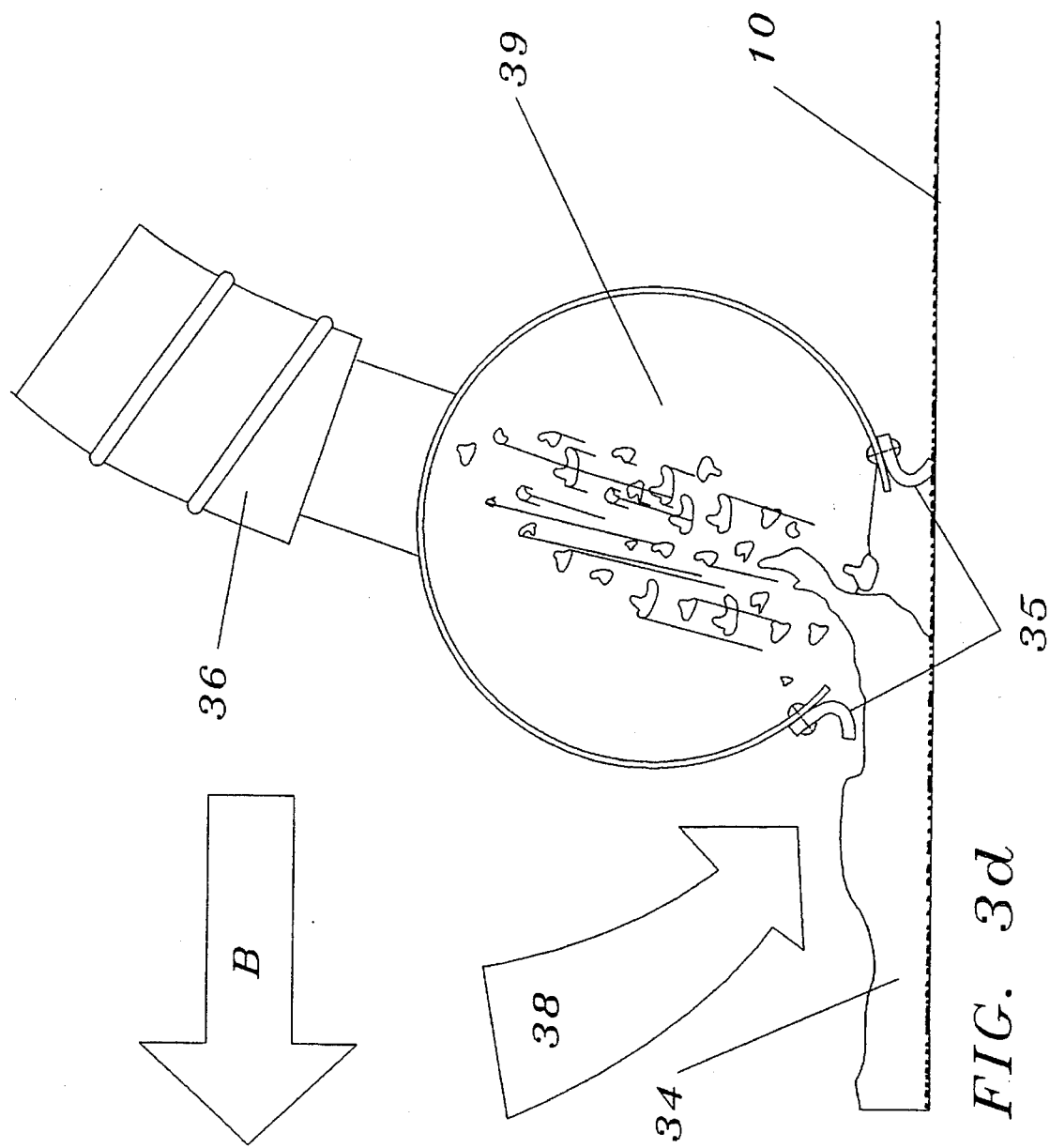

APPARATUS FOR WATER PURIFICATION BY CULTURING AND HARVESTING ATTACHED ALGAL COMMUNITIES

BACKGROUND OF THE INVENTION

This invention has particular utilization with the techniques disclosed in the Adey U.S. Pat. No. 4,333,263 entitled "Algal Turf Scrubber," which issued Jun. 8, 1982 and the Kyle R. Jensen invention entitled "Low Pressure, Low Head Buoyant Piston Pump for Water Purification," Ser. No. 07/697,942, a Notice of Allowance upon which was mailed Dec. 24, 1991.

Algal turf scrubbing can potentially be used for a variety of applications. For example, the scrubbers can be used to replace the biological or bacteriological filters in aquaria. Scrubbers can also be used to remove nutrients and other contaminants from polluted waters. Finally, by harvesting the algal mass, various process technique can be used to produce biomass as an energy source such as methane or ethanol, as a fertilizer or as a human or an animal food additive or supplement, cosmetic or pharmaceutical.

Studies in algal turf production are well known and reported in the literature. For more than 20 years, tropical reefs have been acknowledged to be among the most productive of natural systems. For example, in Lewis, "Processes of Organic Production on Coral Reefs," pp. 305–347, 52 Biol. Rev. (1977), production values as found, for example, on Page 312 therein, indicate that coral reefs are among the highest producers in primary production values for pelagic, benthic and terrestrial ecosystems.

Notwithstanding the values demonstrated in some earlier literature, recent efforts have demonstrated that those estimates of reef primary productivity were conservative. The mean reported value, 10.3 $Gc/m^2/day$ should be contrasted to values ranging from 9.2 to 32.7 $Gc/m^2/day$ in a 1980 study referring to St. Croix reefs. Such recent studies have demonstrated that algal turfs in conjunction with wave surge have been identified as the primary source of most reef productivity. The latest large scale pilot plants in fresh water agricultural irrigation waters Algal Turf Scrubbers or periphyton scrubbers with variable wave energies have repeatedly demonstrated production averaging 35 g/m2/d with peaks well over 40 g/m2/d.

Within this technology it has been known that the removal or severe reduction of wave surge motion can reduce primary productivity, subtle manipulation of sometimes very light wave energies of various patterns across the growing surface can fine tune the performance of periphyton filters or Algal Turf Scrubbers such that a desired speciation of algal turf can dominate and thus specific forms of a particular pollutant can be more effectively removed. In some areas such as reef systems typical daily cycle of oxygen concentration in a reef microcosm can be greatly affected by wave surge action. Reef production is accurately measured only near oxygen saturation since atmospheric exchange is a factor at higher or lower oxygen concentrations. When a wave generator used in such reef microcosm devices is stopped, given the same current, light, and nutrient levels, net productivity is nearly zero. The lack of an oxygen spike when the wave generator is restarted indicates that greatly reduced production is a real factor as opposed to an apparent condition because storage has not occurred.

Additionally, within the reported literature on research in this technology, there are a number of reports dealing with algal techniques for waste recycling, oceanic farming, or the like. Contemporary research can be grouped in two distinct categories: those utilizing macro algae and those using planktonic algae. In the first group, macro algae reports dealing with waste recycling or the like can be found in Ryther, et al, "Physical Models of Integrated Waste-Recycling Marine Polyculture Systems," Aquaculture, 5,163–177 (1975); California Institute of Technology, Graduate School Project "Evaluating Oceanic Farming of Seaweeds As Sources of Organics and Energy, " U.S Department of Energy, Division of Solar Technology, Contract E (04-3)-1275; and Washington State Department of Natural Resources, Project "Aquaculture of Seaweeds on Artificial Substrates," U.S. Department of Commerce, Contract R/A-12. In the case of planktonic algae, Goldman et al, "Relative Growth of Different Species of Marine Algae in Wastewater-Seawater Mixtures," Marine Biology, 28, 17–25 (1974); Karolinska Institute, "Investigation of an Integrated Aquatic System for Storing Solar Energy in Organic Material," Namnden for Energiproduktionforskning, No. 53 3065 062; and State of Hawaii Natural Energy Institute, "Energy from Algae of Bioconversion and Solid Waste," Hawaii State Government, demonstrate the status of contemporary research using that type of algae.

In either case, research to date has not utilized wave surge motion as discussed herein to enhance the exchange of metabolites between algal cells in the water medium. Also, these known research techniques have not recognized the cruciality of macro algae size, vis-a-vis the shading of one cell by another. Accordingly, such techniques are not suitable for optimum biomass production and the propensity of removing nutrients and other contaminants from polluted waters is severely limited.

Utilized in conjunction with this invention are micro algae of the major groups of benthic algae. In such algae, the use of attached algal turfs, wherein the simple algae all or most cells are photosynthetic, demands critical attention to wave surge motion. By optimizing such surge motion together with harvesting techniques, metabolite cellular-ambient water exchange is optimized and continuous shading of one cell by an adjacent cell is prevented.

Algal turf growth can be achieved in an aqueous environment by providing a suitable vacant area in which spores may settle. The first colonizations are usually microscopic diatoms which are then rapidly dominated by the turf species. In accordance with the present invention, the harvesting of such turfs must occur before they are overgrown in turn by the larger macroalgae or macrophytes.

This keeps production rates at a high level and minimizes predation by grazing microorganisms. The rate of harvesting is dependent on light levels, temperature, water culture nutrient concentration, micro nutrient concentration and surge action. Immediate regrowth of the algal turf will occur if the vacant surface or substrate is sufficiently coarse to allow a filamentous base of the algae to remain following harvesting. Typically, such a substrate can be a plastic screen having screen grid dimensions in the range of approximately 0.5 to 5 mm, or other highly textured surfaces.

In the past, harvesting was accomplished by simply scraping the algae off the surface, but this often served to incompletely remove portions of the algae and allow these fragments and particles to be discharged into the water system, where by the nutrients previously incorporated into plant mass or otherwise trapped were dislodged, decomposed, broken into small pieces, and flushed back into the waterway upon restart of process design flow rates.

It was to improve upon the procedure of growing, harvesting and processing the algae and other trapped particulates and organisms at large scale (acres or more) and construction of facilities in an advantageous economical fashion, across various geological surfaces with low bearing pressures, which optimize growing conditions for the algal or paralytic community and allow effective removal of bioassimilated or trapped pollutants after they have been taken up from the water, that the present invention was evolved.

SUMMARY OF THE INVENTION

In accordance with this invention, a form of waterway is utilized, the bottom surface of which waterway is provided with a screen or other growing substrate, upon which substrate a bed of algae is allowed to grow to form an algal turf. I prefer to refer to this waterway as an algal turf floway as it has a significantly longer flow distance and less wave surge action in some cases than previous inventions. These varying conditions promote a wide variation of algal turf or paralytic communities with more flexible filtration capabilities than the original invention described in the Adey Patent. By causing water from a lake, pond, river or other waterway to flow over the algal turf, the water is cleansed to a sufficient degree that it can be re-introduced back into the waterway in greatly improved condition.

In the course of describing and claiming this invention, the term "ALGAL TURF" is to be construed not only as the filamentous algae, but the paraphytic mat or community of matter which is allowed to or caused to exist with the filamentous algae. The later includes but is not limited to: Filamentous algae rooted by holdfasts on a surface, ephitic or clinging plants and animals which grow or are caused to grow from, or in the presents of, the filamentous algae, and the particulate matter trapped or otherwise detained in the course of manipulation of previously described elements, and, or, all matter which can be removed from the floway via the harvesting process.

Another term I have used herein, that is to be construed in a broad way, is "Mature Algal Turf". By Mature algal turf I mean the moment or range of moments which the algal turf production reaches a point where due to size, development or other reasons, significant portions the community of life comprising algal turf becomes un-stable physically and is released from its attachment and moves undesirably from its captive growing area such that it cannot be harvested. In many instances, the algal turf matures in seven to fifteen days, but I am not to be limited to this number of days.

Another term utilized herein, that is to be construed in a broad way is "SECTOR". By Sector I mean a lateral division of floway surface in its longest direction, whereby the algal turf of a selected longitudinal sector is harvested by a means of laterally adjustable equipment. I prefer that an even number of longitudinal sectors be selected on a floway such that both travel to and from a given point can accommodate the harvesting of algal turf.

Still another term which is to be construed in a broad way is "CURB". By Curb I mean a divisional ridge of various height which serves many purposes such as structural support, division of algal turf treatment areas, as well as dispersed distribution of loads to underlying strata such as soft soil. I may interchangeably use the word beam to describe the curbs I use. Although I could have curbs whose elevation is constant, causing a differential dimension between top of curb and sloped growing surface, I prefer a constantly sloping curb mimicking the elevation of the floway such that there is no change in dimension from curb to floway from one place to another along the floway. I prefer this constant dimensional relationship to reduce or eliminate the need for elevational changes in the location of the intake plenum means I use for removing mature algal turf from its growing surface.

Still another term which is to be construed in a broad way is "VACUUM INTAKE PLENUM". I intend these words to mean an orifice which is adjustable in elevation as well as its positioning within a specific floway Sector, such that the algal turf can be removed from that longitudinal sector. The lateral movement of this Vacuum Intake Plenum can accomplished by various means. As an alternative, I can use a plurality of fixed Vacuum Intake Plenums for accomplishing the harvesting.

As will be seen hereinafter, for large scale efforts I may subdivide the algal turf farm longitudinally into various floways, such as by separating walls extending substantially the entire distance between the upstream weir and the downstream weir, and additionally I divide the floways into a number of Sectors (two in the case described) which serve in description of the harvesting evolution. Such an arrangement makes it possible for my algal turf floway to operate on a continuous basis, with the algal turf continuing to grow in some sectors during the time the algal turf in another sector is being harvested in a dewatered state.

As is known, algal turf possesses the highly advantageous ability of being able to take up or otherwise trap undesirable nutrients or minute particulate matter contained in the water, and to incorporate such nutrients into their plant mass and promote a paralytic community of superior particulate trapping ability.

Accordingly, by causing the water to be treated, to flow in a prescribed manner over the algal turf, the undesirable nutrients and pollutants can be removed from the water, with the treated water thereafter being permitted to flow back into the lake, marsh or other waterway or basin in a greatly improved condition.

A basic configuration of my algal turf floway, over which the water to be cleansed is caused to continuously flow (except for short durations at harvest), comprises an upstream weir, a downstream weir, and means defining the Curb or sidewalls of the floway, also known as beams. Typically a first canal brings water from the waterway to the location of the upstream weir such that predictable quantities of water can flow over or through the upstream weir and into my novel floway. After flowing over the algal turf for a suitable distance, the cleansed water then flows over the lower weir. There can be intermittent notched diversion tabs to trap filamentous algae and particulates as well as enhance mixing and prohibit channelization of water flowing down the floway between the inflow and out flow weirs. These tabs are rigid enough to accomplish previously described tasks, but flexible enough so as not to require special consideration or repositioning of the vacuum intake during harvest. I utilize a second canal to receive the water flowing over the lower weir, which second canal then delivers the cleansed water back into the lake, pond, river or other such waterway.

I provide a suitable bottom surface for my floway, that is conducive for the growing of an algal turf thereon. This bottom surface may be comprised of plastic membranes and films, concrete, asphalt, or naturally occurring geologic features. These surfaces must have suitable texture to provide protection from over harvesting which can occur on smooth surfaces when the holdfasts are undesirably removed along with the mature algal turf. Conversely there may not be voids in the surface such that organisms can find suitable domicile and undesirably eat, and excrete, algal turf as well as reproduce in numbers which limit productivity of the algal turf communities ability to remove pollutants. There may however be small rod like appendages in all or a part of the floway extending from growing surface to slightly above water surface which catch broken off Algal turf and reduce channeling. These remain of the surface during harvest and do not hamper the harvesting process. Examples of these surfaces may include but are not limited to rock formations, metals, wood, plastics, fiber reinforced plastics, glass, ceramics, soils or even natural fibers, woven or processed or higher order plants.

It is well known that the cleansing function provided by the algal turf is assisted by having the lower algal turf filaments flashed with light, for this greatly assists a photosynthesis action of plant cells covered by algal turf or of organisms growing on top of them. To this end, I utilize a suitable means at a location adjacent the upstream weir for creating a variable surging action. This means is actuated periodically in a manner causing a wave to pass substantially across all or part of the length of the floway. This surge can in some water systems, serve to promote growth of more diverse type algal turf such as filamentous algae on which other epiphytic or attached plants and animals can thrive.

The surge can take place at different rates and magnitudes. Surges at least once per minute, but preferably approximately four to eight times a minute, can, in certain water systems, serve in a highly effective manner to stimulate the growth of specific species groups lending to the optimization of the pollutant uptake ability of the algal turf. At some places on the floway the surge may not be readily detectable or even dissipated to the point where it is not detectable.

It is also well known that after a number of days of growth, the algal turf matures, growth starts to sluff off algal turf. Nutrients and pollutants incorporated into the algal turf begin to be re-released into the water being treated. Therefore it is necessary to periodically harvest the relatively mature algal turf and effectively dispose of same in order to successfully rid the lake basin or other waterway of these undesirable pollutants. This is to say, unless the mature algal turf is harvested in an effective manner, it is possible for the nutrients already taken up by the algal turf to find their way back into the waterway. Accordingly, it is an important purpose of this invention to utilize a highly improved system for removing the algal turf from the growing substrate to which it is attached, without resorting to a scraping effort that might well be counterproductive as previously described.

It therefore provide means for harvesting the algal turf in a dewatered but wet state that are at least five days old, with almost all associated matter, except algal turf roots or holdfasts. This algal turf is removed in a manner not permitting any significant portions of the mature algal turf to remain in a dislodged and broken down condition such that it is flushed over the lower weir, and thence back into the waterway after harvest.

The preferable means for harvesting the algal turf involves the use of a highly effective vacuum system that will cause substantially all portions of the mature algal turf to be removed, thus avoiding the situation often encountered at large scale when utilizing a scraping action, where portions of the mature algal turf often remain and thereafter find their way back into the waterway.

It is therefore a primary object of this invention to provide an algal turf floway capable of being constructed in many geologic soil conditions that is able to function in a low cost yet highly effective manner to cleanse the water of a waterway, such as runoff to or from a basin, lake, pond, river or the like. In lake and agricultural areas this often requires installation of the growing surface over soft organic soils. While culturing the algal turf itself requires no significant soil bearing pressure, the weight of the harvested biomass as collected on the harvester can greatly exceed the limits of soft soils and cause undesirable rutting by the harvester on the growing surface. Therefore I employ several novel methods such as utilizing grade beams which can act to distribute the weight over a greater area of soil thus reducing the requirement for soil bearing capacity. I employ the configuration of harvester whereby an onboard hose reel allows constant transfer of the considerably heavy algal turf harvest product to a collection point which can be supported for example on a barge in the outflow canal.

It is another object of this invention to provide an algal turf floway capable of harvest when mature, to effect removal of pollutants during this purification of the water.

It is yet another object of this invention to provide a surging action in all or part of the floway, as can cause a more diverse algal turf to develop, cause the algal turf to be flashed with light periodically, cause the water to be mixed, and physically drive nutrients and particulates into intimate contact with algal cell walls, such that bioassimilation through photosynthesis and trapping action will be greatly enhanced by algal turf.

It is still another object of this invention to provide for the effective harvesting and removal of mature communities of algal turf in a dewatered but wet state by a highly effective vacuum technique, this being accomplished after flow is greatly reduced by an inflow weir dam, and accelerated by removable outflow sluice gates in the outflow weir without upsetting or dislodging the algal turf and effectively collecting the algal turf for further disposal or processing. Dislodged or broken fragments of the algal turf should not be allowed to remain on the surface of the screen after harvest. This lose algal turf can produce a loss of efficiency in filtration by permitting these dislodged products to be flushed off the captive growing surface back into the waterway whereby the incorporated pollutants bioassimilated and trapped in the Algal Turf can decompose into less desirable materials.

It is yet still another object of this invention to provide a novel power driven harvester device designed to roll along continuous grade beams or curbs that maintain a consistent flatness of surface or slight slope. These grade beams, can be structurally contiguous through utilization of common means and thus distribute the wheel loads of the harvester over a wide area of soil contact which allows them to remain in a desired relationship despite the fact they have been placed over soft organic soils.

It is another object of this invention to utilize a floating barge to collect the algal turf harvest product as well as deliver the harvester from one floway to the next. The barge may have additional processing equipment on board to effect specialized biomass preparation as needs arise. Examples of the later include but are not limited to centrifuge separators, belt driers, spray driers or the like.

It is a further object to utilize an onboard discharge hose on the power driven harvester, for conveying harvest slurry back to a holding barge or storage area, thus greatly reducing storage requirements and keeping wheel loads of the harvester light enough for the grade beams to distribute over soft soils with a low bearing capacity.

It is another object of this invention to utilize an impervious plastic membrane growing surface over soft soils to prohibit water saturation of the underlaying soft soil which can cause great reduction in the bearing capacity of the soil. This surface has a high texture and can in places be equipped with small attached rod like plastic sticks similar to toothpicks which withstand and remain after harvest. Water that does migrate below the membrane can be drawn out by common well point pumping devices.

It is another object of this invention to provide intermittent diversion tabs at various intervals along the floway to limit channelization of flows. These can be notched or otherwise fashioned to aide mixing of water.

It is still another object of this invention to establish a floway involving a growing surface of suitable texture for optimal algal turf production, located between a spaced pair of curbs, upon which algae can grow and form an algal turf, with a periodic surge of water being caused to flow along at least part of the floway, so as to increase algal metabolism, production, and species diversity, such that nutrients and pollutants contained in the water will be taken up, and particulates contained in the water trapped.

It is yet another important object of this invention to provide a novel method for the purification water by natural means, utilizing algal turf grown on a suitable growing surface disposed between parallel, spaced apart curbs, which algal turf is harvested, when mature, by the use of a harvester arranged to travel the length of such curbs, upon which harvester, a vacuum intake plenum is utilized, with the disposal of the harvested algal turf being accomplished in such a manner as to prevent any entry of the algal turf into a waterway.

These and other objects, features and advantages will be more apparent from the figures of drawing.

BRIEF DESCRIPTION OF DRAWINGS

FIG. 3a is a cross-sectional view showing one type of vacuum pickup that can be utilized for removing mature algal turf from a floway;

FIG. 3b is a cross-sectional view of a different type of vacuum pickup, this one utilizing a squeegee or brush for aiding the removal of algal turf from the growing surface;

FIGS. 3c and 3d are related views, with FIG. 3c showing algal turf pickup by the use of a bidirectional pickup nozzle, with travel taking place from left to right, whereas FIG. 3d shows the same pickup nozzle, with travel taking place from right to left;

FIG. 4b is a front elevational view of the same harvester depicted in FIG. 4a.

DETAILED DESCRIPTION

Figure 1:
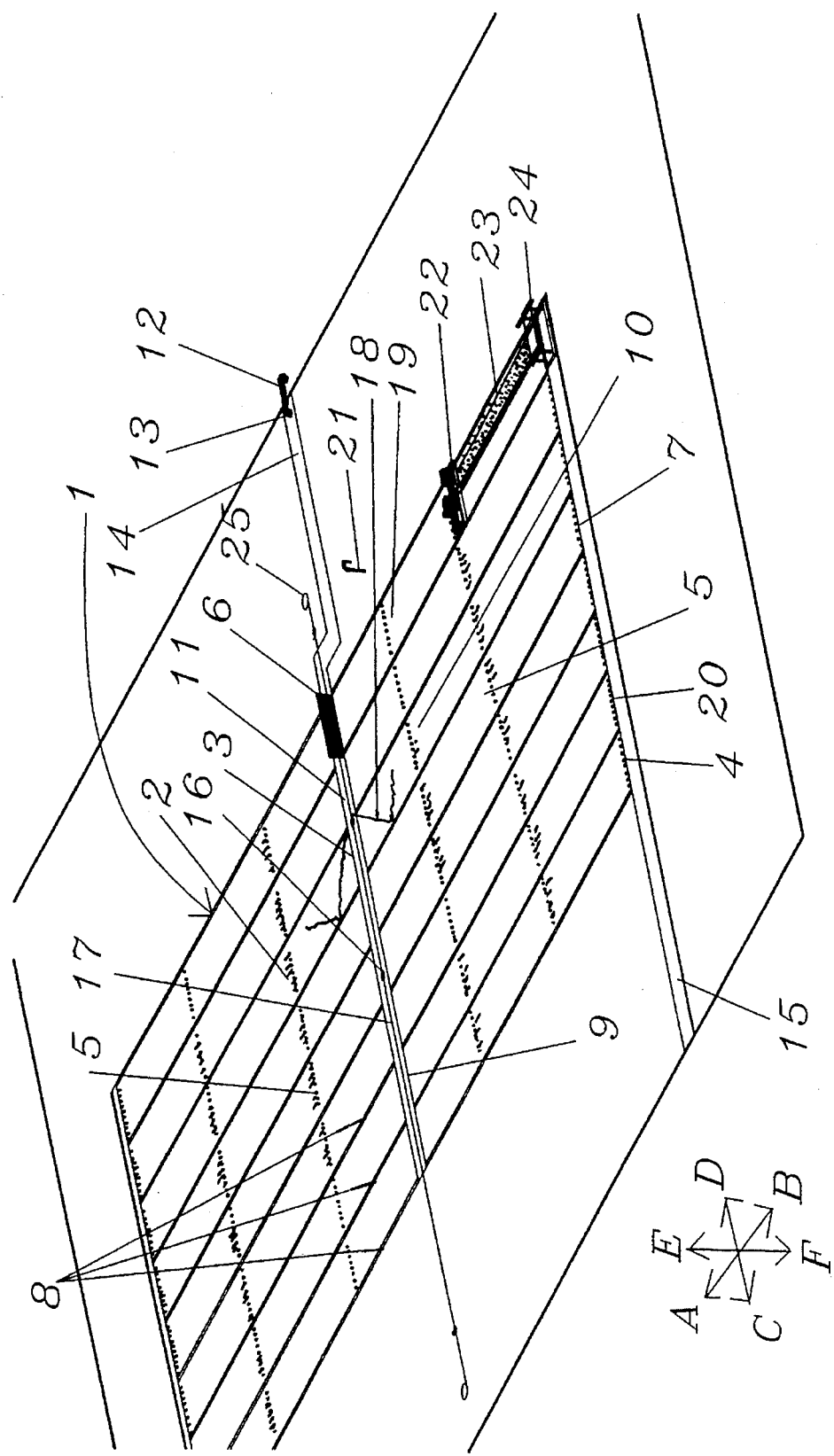
FIG. 1 is a perspective view of an algal turf farm, in which numerous floways are defined, with water from a lake, marsh, pond, river or other waterway being caused to flow along such floways, with this figure also indicating the use of adjustable inflow and outflow weirs, for controlling the flow of water.

With initial reference to FIG. 1, it is to be seen that I have provided what I regard as an algal turf farm 1, located adjacent a form of waterway that I have created for the continuous purification of water. It will be noted in FIG. 1 that I have shown a number of floways, which I prefer to refer to as being algal turf floways 2, in which communities of algal turf grow under suitable conditions.

In one embodiment, each algal turf floway 2 was 22 feet wide and 750 feet long, but quite obviously this is only one particular embodiment of my invention linked to treatment parameters of one water system, and I am by no means to be limited to any particular size or configuration of an algal turf floway. A criteria in this regard is that the floway should be at least as long as it is wide.

As will be seen hereinafter, my invention may also be practiced at the scale of an algal turf farm 1 divided longitudinally into floways 2 by the use of separating walls or curbs extending substantially the entire distance from inflow weir 3 to outflow weir 4. Further, each floway may be regarded as being divided into sectors 5, as is to be seen on the left side of FIG. 1.

In accordance with this invention, a harvester 22 is utilized to move along each of the floways 2, one floway at a time, with a vacuum pickup arrangement on the harvester serving to harvest the mature algal turf in only one half or sector of the floway during movement of the harvester in one direction, and then harvest the algal turf in the other half or sector during movement of the harvester in the return direction. The details of the harvester will be discussed in considerable detail in connection with FIGS. 4a and 4b.

One advantage of a divided farm is of course that harvesting of mature algal turf can take place in one floway that has been dewatered. Such is accomplished by virtue of the placement of an inflow weir dam 6 and removal or outflow weir sluice gates 7, which greatly diminishes flow and allows gravity to dewater but not dry the algal turf while full flow is continuing in other sectors. This practice greatly enhances the harvester performance with minimal water collection and greatly reduces algal turf processing effort.

As revealed in FIG. 1, the algal turf floway 2, over which the water to be cleansed is caused to continuously flow, may comprise an upstream or inflow weir 3, a downstream or outflow weir 4, and means defining sidewalls 8 of the floway. I also refer hereinafter to the sidewalls 8 as beams or curbs.

The sidewalls 8 are of consistent height so as to form the support for a harvesting vehicle mounted on wheels. The sidewalls 8 are of sturdy construction and in some cases have relatively wide bases, so that they can distribute harvester loads over soft soils and not become displaced during use, even though supported over relatively low bearing capacity soils. I utilize a consistent spacing between each adjacent pair of sidewalls, so that the harvester 22 can travel therealong during the harvesting of mature algal turf.

It is to be noted that the upstream or inflow weir 3 can be of adjustable height, so that the flow of water over the weir can be carefully controlled. In addition, the inflow weir 3 may utilize articulation, such as, but not limited to, notches 9 placed at the top of the inflow weir so as to have a favorable effect upon the surging or spillage characteristics of this weir. As previously mentioned, the flow of water across the inflow weir 3 is preferably reduced just prior to and during harvest by placement of an inflow weir dam 6, and removal of outflow weir sluice gates 7 at the time the mature algal turf is to be harvested, so as to greatly reduce the water component and weight of the harvest wheel loads.

As will be described in greater detail hereinafter, I provide a suitable bottom surface or growing surface 10 for my floway, that is conducive for the growing of an algal turf thereon. This surface can be of a wide range of materials as long as the texture is such as will enable algal holdfasts (roots) to remain after harvest, while possessing the characteristics of compatibility with the harvest procedure, being able to withstand ultraviolet light, and being usable as a growing surface for an acceptable length of time. There can be rod like pins spaced intermittently or in patterns which extend from growing surface to just beyond water surface which catch dislodged algal turf. However, the surface should not be of such a nature as to permit algae eating organisms to remain after harvest, for should such organisms reproduce in large numbers, their excretion of digested biomass would limit filtration efficiency.

Figure 2A:
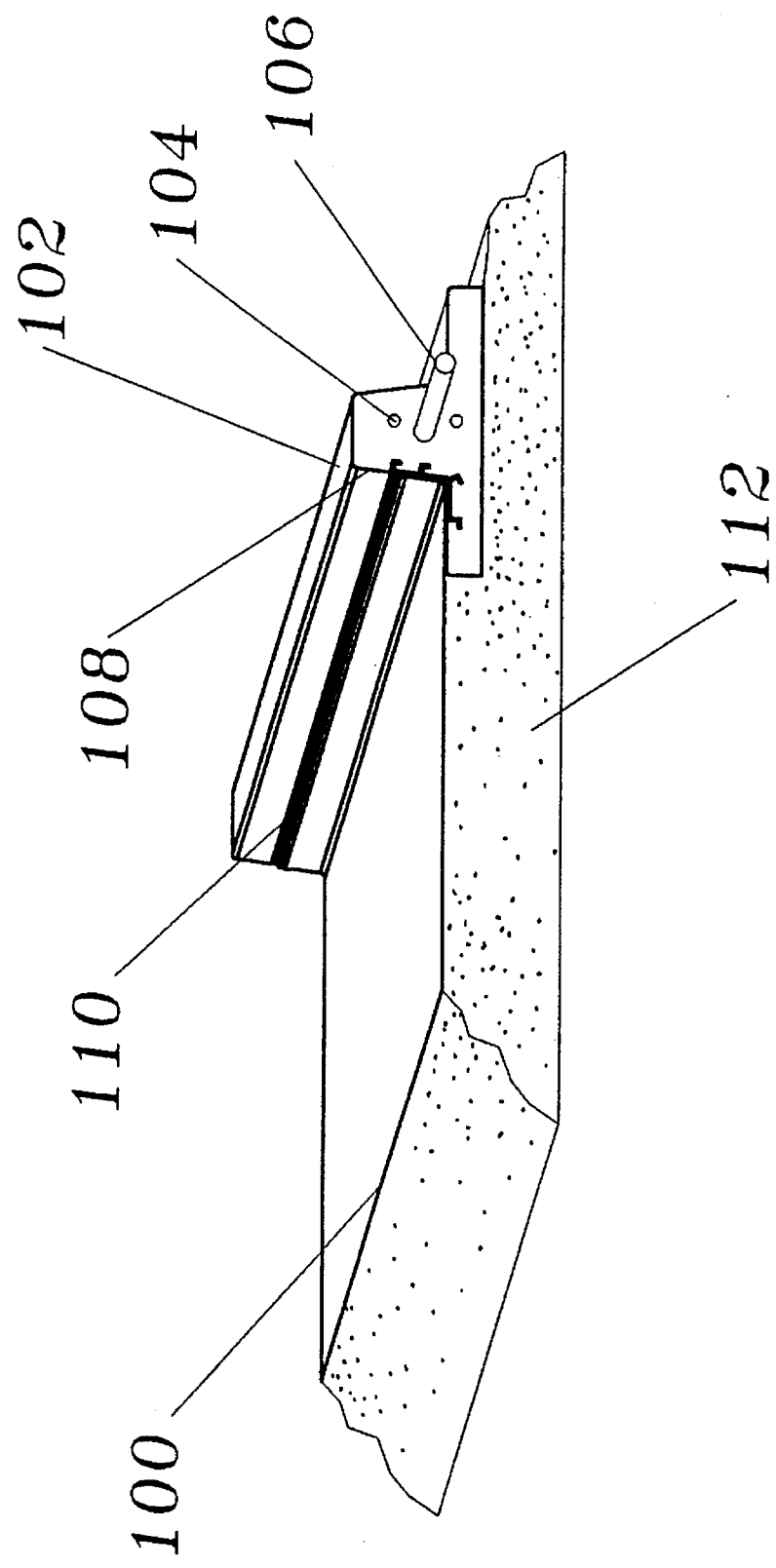
FIG. 2a is a perspective cut away view depicting one type of curb or beam utilized to define a floway in accordance with this invention, with this view also showing the manner that a thick, high strength polyethylene growing surface may be attached to the curb.
Figure 2B:
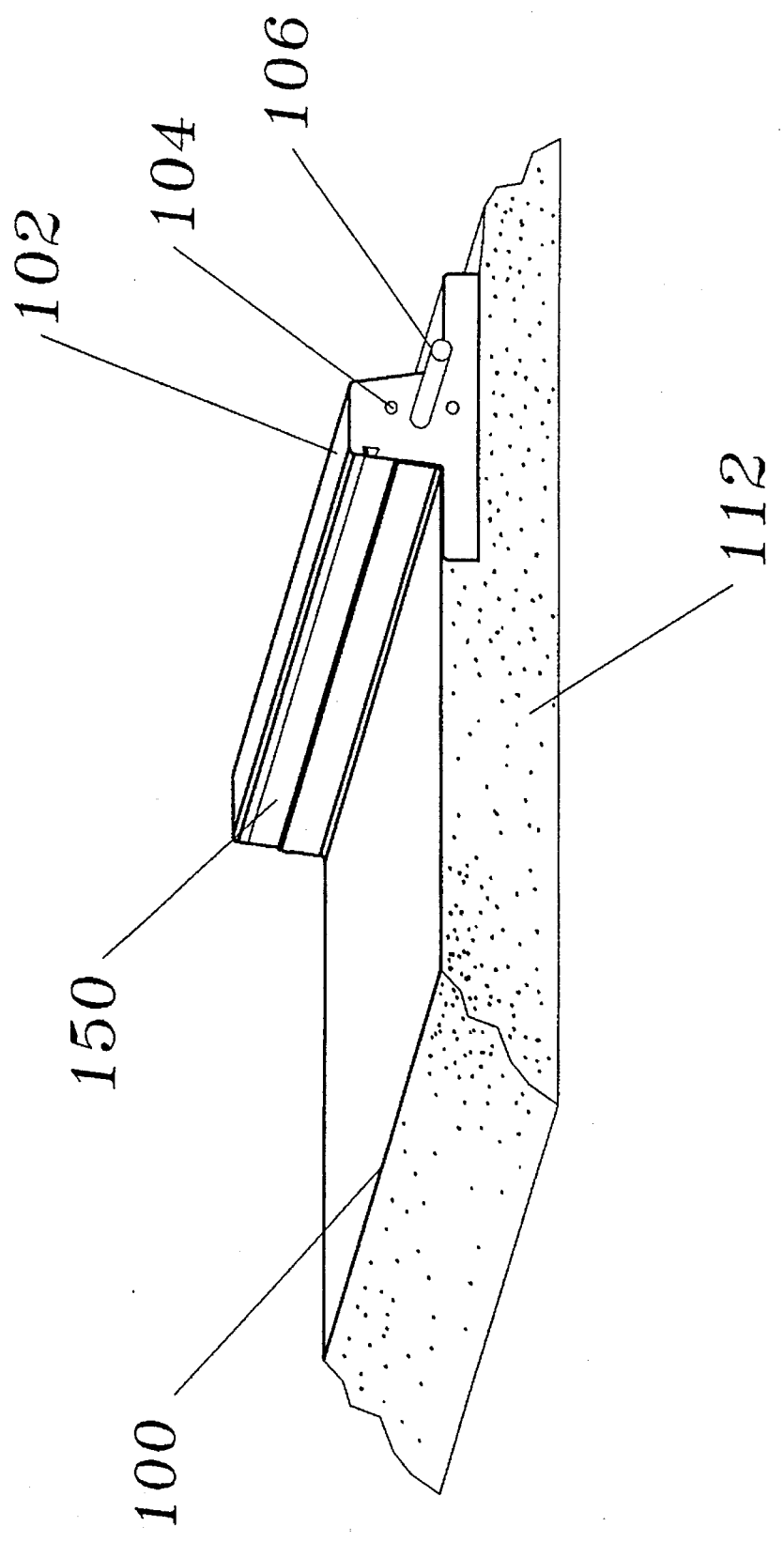
FIG. 2b is a perspective view similar to FIG. 2a, with this view showing another way for attachment of the growing surface to the curb or beam.

As may be seen from reference to FIG. 2a and 2b, I typically prefer to use materials such as HSPE or High Strength Polyethylene plastic or other plastic liners in soft soil areas, as well as natural limestone formations, concrete and asphalt. Note also FIGS. 2c, 2d and 3. As is obvious, I am not to be limited to these materials.

Typically a first or inflow canal 11 is utilized for bringing water from the waterway to be cleansed, to a location adjacent the upstream or inflow weir 3. The inflow canal 11 can be unlined, or alternatively it may be lined with a plastic, wood, steel or concrete liner, or a grout filled mat or sheet pile system. The effect of moisture on soil abilities and availability of materials and skilled labor are usually the factors in selection of these options.

The substrate under growing surface 10 may be selectively dewatered by suitable dewatering pumps 21, which automatically pump water collected at subsurface intakes to surface locations, to maintain moisture of subsurface soil.

With regard to the water from the waterway to be purified, in some instances, water flows by gravity to the inflow canal 11 at a location adjacent the upstream or inflow weir 3, but in other instances, I find it necessary to utilize a pump 12 and suitable piping 13 in order that predictable quantities of water can be provided at outlet 14 to the location adjacent the upstream or inflow weir 3. The pump 12 is preferably a centrifugal or axial flow pump, but the design of the pump is not of particular consequence to this invention.

After flowing over the algal turf floways 2 for a suitable distance, the cleansed water then flows over the outflow or downstream weir 4. I utilize a second or outflow canal 15 to receive the water flowing over the outflow weir 4, which second canal then delivers the cleansed water back into the lake, pond, river or other such waterway.

Because of the nature of the algal turf community, it is highly desirable to cause the water to be purified to pass in surges over all or part of the algal turf. One method to create such surges by the use of a periodically operating lightweight, buoyant piston as described in the Jensen Buoyant Piston Pump patent application Ser. No. 07/697,942, upon which a Notice of Allowance was mailed from the U.S. Patent and Trademark Office on 24 Dec. 1991. However, in FIG. 1, I utilize a wave making device 16 in canal 11 at the upstream end of the floway or growing surface, immediately upstream of the upstream weir 3, as well as in other inflow canals 11 such as in the canal at the top of FIG. 1.

As shown in FIG. 1, the wave making device 16 may comprise a cable or cord 17, which moves several floating volumes 16 which displace water and create a wake 18 when actuated in the general direction C-D of the cable or cord, similar to that from a boat. The cord is actuated by a power driven wheel 25 which has a means of alternately rotating clockwise and counter clockwise while wrapping the cable 17 causing float 16 to disturb water creating wave surge 18. By this arrangement, a suitable disturbance 18 is created in the inflow canal water surface, which translates into a desirable surging articulation of water entering each floway 2.

I am not to be limited to any particular speed of operation, but it is desired that a surge of water pass over the algal turf of the floways at least once per minute, but more preferably the surge of water passes over the algal turf at least once every 15 seconds. These waves of water result in a desirable form of surge action, with the water passing over the weir 3 causing nutrients to flow over and be driven into intimate contact with the algal turf. This enhances nutrient uptake up by the algal turf through bioassimilation, and trapping by the algal turf.

The surging device I prefer to use is designed to articulate the water and effect the growth of certain and varying algal turf species that may dominate a portion of the growing area. Consequently, different filtration objectives may support different surge rate and strength variations and these variations can be manipulated to tune the algal turf floways or scrubbers to suite the water filtration objectives.

For example: water in high surge zones can tolerate greater flow variations such as 100%–1000% increase over minimum algal turf community sustenance levels. This type of environment stimulates the proliferation of filamentous algae which are generally better suited to removal of reactive nutrients and pollutants.

Water in low surge zones is capable of supporting more fragile plant assemblages as well as diatom proliferation and attachment. These areas are not as stable in variable flow environments, but they display optimal particulate trapping ability. My invention is of sufficient breadth that I may utilize various techniques, as may be appropriate in a selected instance for a given water system filtration requirement.

The preferred height differential between the inflow and outflow weirs is dependent upon the length of the floway and the speed of water flow that is desired. The normal weir differential is in the range of 1 inch to 20 inches, but I obviously am not to be limited to this. In some locations, such as in fallow field during harvesting, algal turf can be grown in a flooded location where virtually no slope is present and to a large degree the weir elevation differential is dependant on design water flow rate. There is a desirable range of water depths in the floway which is required to maximize the device performance. As an example, algae are rooted on substrate support algal plant canopies and epiphytic (clinging) plants and other organisms etc. attached to plants which will grow to fill between 0.5" and 6" and up to 12" depth of watering extreme cases.

So while the desired depth of water in the floway is from 1 to 3" tolerances for the process have been shown to work satisfactorily in up to 6" and depths to 12" are acceptable in some places. The desired range of depth of water is from a minimum of approximately ½ inch up to something on the order of six inches to twelve inches as previously described, with the particular range of depths being brought about by a suitable manipulation of the weirs.

As will be understood by those skilled in this art, water treatment occurs while the water is moving across the algal turf, at which time the pollutants come in contact with the algal turf or are otherwise trapped by organisms in the paraphytic mat. Algal turf is a diverse and stable community with respect to production across all seasons and is comprised of many organisms which can solely include that which is ambient in the water system or a modified plant and animal community achieved through inoculation of non-ambient constituents.

It is well known that an optimum uptake of nutrients is accomplished by algal turf that are from four to twenty-five days old, with it being my preference that algal turf that are approximately seven to fifteen days old be regarded as mature and therefore removed from the floway. The length of harvest is determined by monitoring the quantity of cells falling or sloughing of algal turf off the floway surface, and harvesting prior to high sluff conditions with consideration of expected flow rates. As is obvious, care must be taken in harvesting the algal turf, for it is desirable for the remaining algae holdfasts to quickly regenerate algal turf.

As mentioned hereinabove, the water being purified continues flowing down the growing surface 2, in direction A-B, guided by the sidewalls or curbs 8, and thereafter flows over the outflow or downstream weir 4, and thence into the second or outflow canal 15. From this canal, the treated water flows back into the lake or other waterway. It should be noted that a filter or a screen strainer can be utilized along with the intermittent flow diversion tabs 19 in conjunction with the outflow weir 4, so that algal turf sluff may be captured and restrained from the outflow water. For example: closely spaced vertical pins 20 or a course mesh at the top of the outflow weir can hold dislodged algal turf filaments which then can be gathered at harvest time.

Considering the previously described methods of harvesting eg. mechanically scraping the screen or other substrate upon which the algal turf is growing often causes portions of the algal turf to be left behind, and thereafter carried back into the lake or other waterway. Accordingly, it is most important that the harvesting procedure serve to effectively remove pollutants absorbed from water and otherwise trapped by algal turf, leaving behind only the algal roots or holdfasts. If these pollutants and nutrients are to be prevented from re-entering the filtered water, it is advantageous to utilize a vacuum system such that large quantities of algal turf are entirely removed from the growing substrate, leaving only the roots or holdfasts attached to the substrate.

As depicted in FIG. 1, I may utilize a harvesting barge 24 that not only serves to collect and store the considerably heavy harvested algal turf slurry and transport it via the outflow canal to a collective storage location, but also is equipped with means of lifting and moving the harvester from one floway to another floway so that harvesting can be executed on multiple floways with one harvester vehicle. The details of the barge 24 will be discussed at greater length hereinafter.

It has been mentioned hereinabove that I utilize an algal turf harvester 22 to move along beams or floway tracks in the harvesting of the algal turf. These beams or rails, one of which is depicted in FIG. 2a, are also known as the floway track grade beams 102. The beams are placed at a consistent spacing, and serve to distribute harvest load to soft soil 112 over a wide area and reduce settlement and rutting by heavy wheel loads encountered with harvesting equipment. The beams also provide for anchor or attachment for the sides of the membrane 100 for algal turf growing area, as will be noted in FIG. 2a. These beams range in base width size from 12" to 72" for spacings of 10 feet to 40 feet, and can be wider in larger applications. These beams are assembled such that they can be structurally contiguous via prestressed tension reinforcement strands 104 and structural splices 106 to the extent that harvester wheel loads do not cause high bearing pressure at beam splice points.

Also shown in FIG. 2a is a fusion weld 110 of this plastic membrane material, with such a weld being commonly performed with equipment such as MUNCH tool Type U ii or type E sold in the U.S. through Polyflex Corp.

FIG. 2b shows a second method of attaching the edge of a membrane to the beam whereby a ringlet and flashing 150 is typically used on building roof parapet details installed and has the advantage of venting such that gasses which can build up under the membrane may be allowed to escape to the atmosphere. The grade beams or curbs are, in FIG. 2a, composed of precast, pretensioned high strength concrete such as typically used in building construction and designed under standards of the Precast Concrete Institute and other organizations. It may be advantageous in some conditions to utilize a means of maintaining distance between or gauge of the concrete beams such as a tie strand or beam running perpendicular to the grade beams below the membrane. This concrete element is structurally sized by those skilled in the art after consideration of detailed site conditions specifically soil bearing capabilities and loading parameters. These parameters can vary with the moisture range of the sub membrane soil, so for this reason the design of canals 11 and 15 should be strongly considered an analysis of this system. To further the important nature of the soft soil moisture content, I employ dewatering pumps, or well points 21, as mentioned in conjunction with FIG. 1. These pumps are placed at an interval according to previously described issues, and serve to maintain a design moisture content of soil, by pumping water from the sub membrane area to the membrane surface, such that the conditions which support grade beams with stability may be safely maintained. I am not to be limited to a specific size or configuration as conditions are rarely the same in any two locations, nor am I to be limited to this method of soil moisture maintenance.

The harvester 22 may be utilized either with a floway of the type depicted in FIGS. 1 as well as in FIGS. 2a and 2b, or in a more elaborate floway arrangement of the type depicted in FIGS. 2c, 2d, & 2e, which will be discussed hereinafter.

The algal turf growing surface 62 may for example be a 60 mil high strength polyethylene liner with heavy texture similar to that manufactured by Polyflex Corporation or Gundle Corporation and typically deployed for 20 years in containment of landfills or hazardous waste facilities.

Figure 2C:
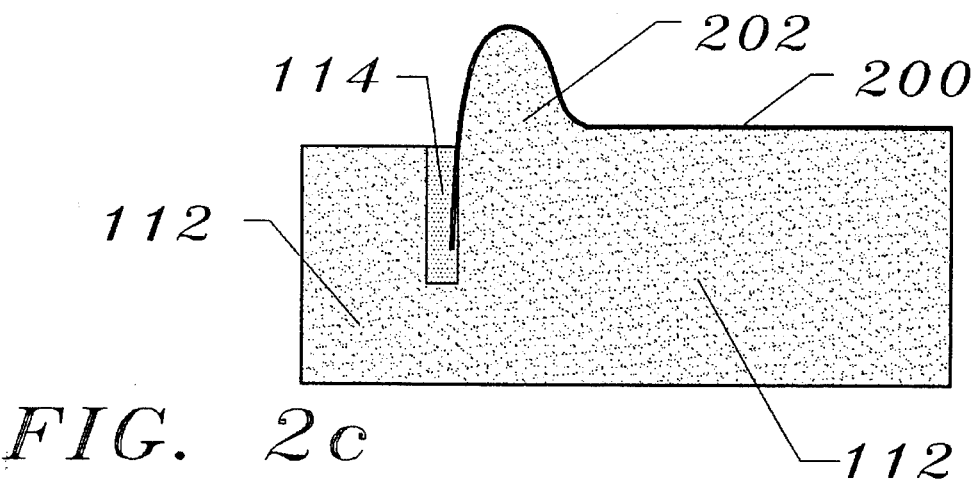
FIGS. 2c, 2d and 2e are cross-sectional views of other types of curb and growing surface arrangements that may be utilized in accordance with this invention.
Figure 2D:
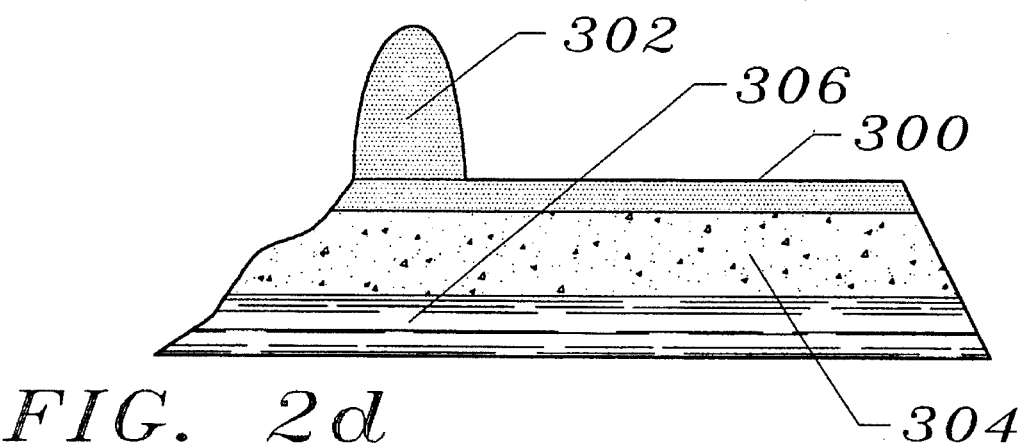
Figure 2E:
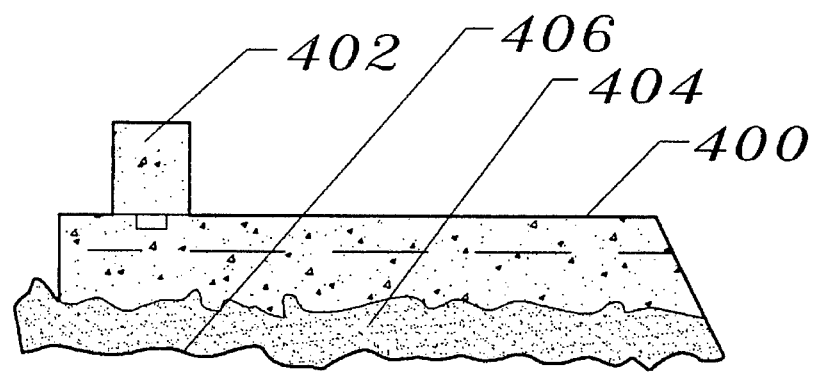

With reference to FIGS. 2c, 2d and 2e, it will be noted that these figures delineate other means and materials which can be used in the construction of floways. FIG. 2c shows a membrane scheme which is whereby HSPE 100 is spread over finely graded soft soil 112 and a ditch is made to accept end of membrane 100 and soil excavated fills trench 114 and a membrane covered curb 116 is formed by fabric 100 by soil piled at edges of the floway. This type of floway requires a harvester which will span the soil formed curb and move on large rubber tires which bear directly on the soil some short distance outboard of the soil formed curb. Such rubber tires are common on agriculture equipment.

The schemes represented by FIGS. 2d and 2e are suitable only for higher range subsoils conditions natural or man made. FIG. 2d is a simple asphalt growing surface 300 typically used for road pavement with an asphalt curb 302. This assembly is installed over a higher strength stable compacted fill 304 in accordance with standard practices of the pavement industry. FIG. 2e shows a reinforced concrete growing surface 400 with a reinforced concrete curb 402 which act in the same basic capacity as the previously described asphalt scheme detailed in FIG. 2d. Both schemes delineated in FIGS. 2d and 2e would accept either type of harvester wheels.

Figure 3C:
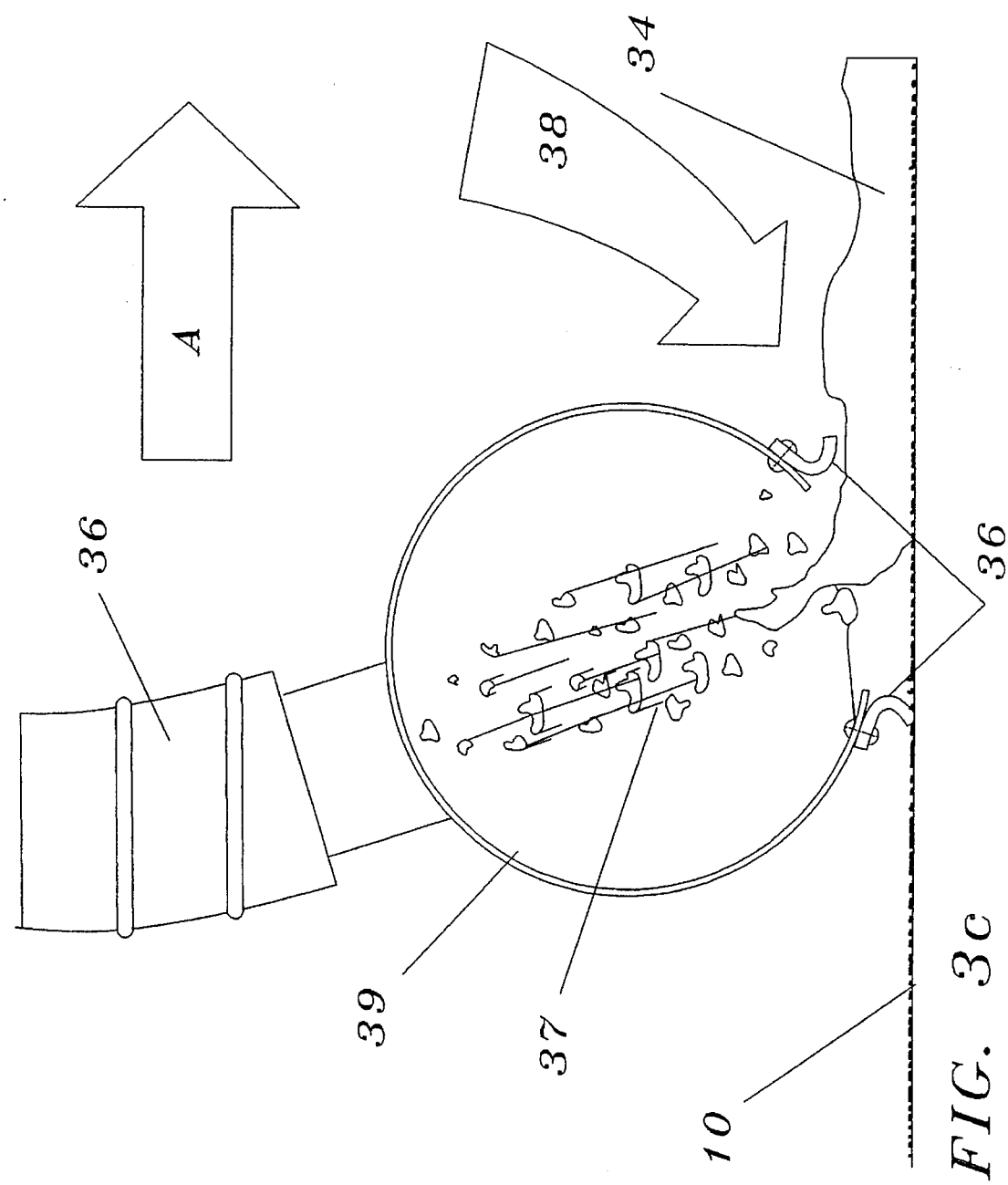

With regard to FIGS. 3a through 3c, I have found that what I choose to call the vacuum intake plenum (or intake nozzle or pickup) is desirably between 1 and 6" wide and 2'0" and 50'0" in length with multiple pickups utilized on wider floways and must be configured such that vacuum principles are employed to lift the wet algal turf off the growing surface. This is accomplished, as shown in FIG. 3a, by passing the orifice of the intake plenum 33 across the wet algal turf 34 such that the harvest slurry passes as shown at 37 into close proximity with the orifice, and the algal turf is caused to be dislodged and moved by ambient air 38, passing to a low vacuum pressure area 39. Parameters for air volume in cubic feet per minute are between 25 and 25,000 and the vacuum pressure between 2.5 and 250 inches of water as measured in accordance with standards in the industry. The algal turf must come very close (2 inches or less) or actually touch the orifice of the vacuum intake plenum to be adequately removed and conveyed.

Figure 4A:
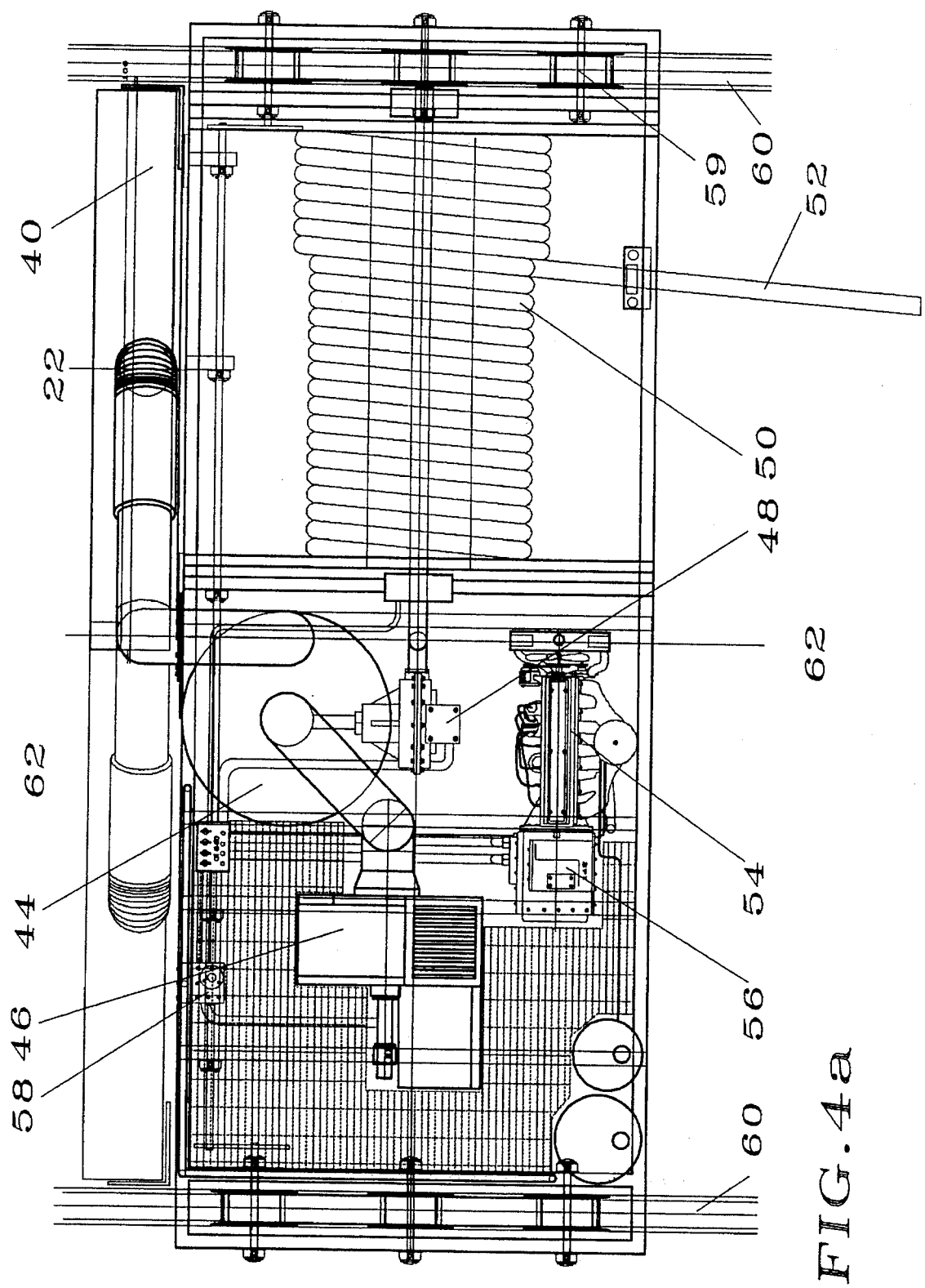
FIG. 4a is a plan view of a harvester 22 in accordance with this invention.
Figure 4B:
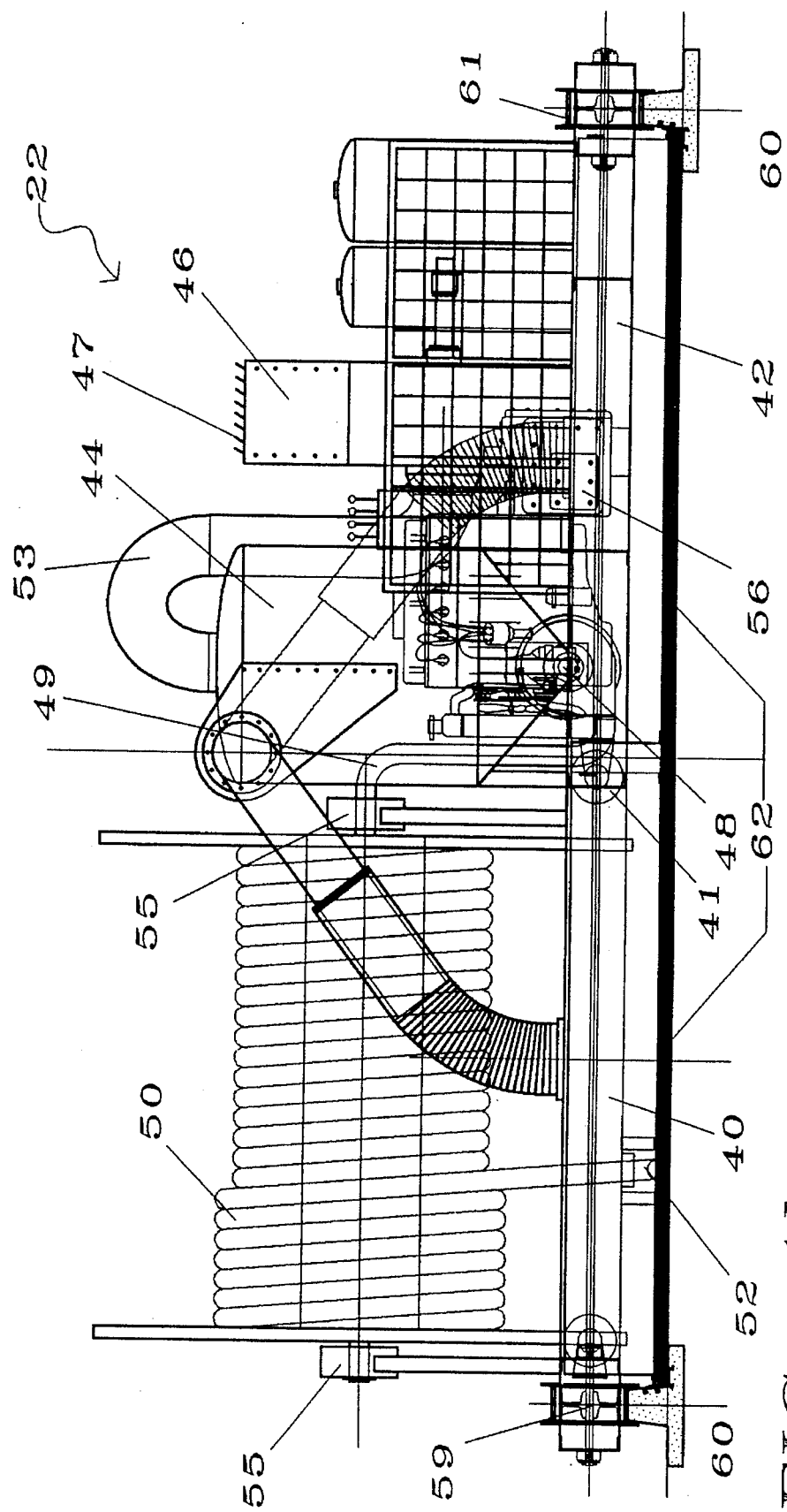

As shown in FIG. 3b, the orifice of the vacuum intake plenum may utilize a flexible squeegee or brush 35 to accommodate irregularities in the growing surface. As shown in FIGS. 3c and 3d, I may utilize a bidirectional vacuum nozzle, actuated by a pressurized liquid system or other means which is to be brought into close association with the growing substrate in order that desirable quantities of mature algal turf can be more completely removed as previously described. In FIGS. 4a and 4b, now to be discussed, it is to be noted that the vacuum pickup or vacuum intake plenum is at 40.

With specific reference now to FIGS. 4a and 4b, I have there shown a preferred version of an algal turf harvester 22, designed to roll along beams or rails or curbs 60 that are placed in a parallel relationship in a direction coinciding with the direction of flow of the water through the floways 2.

The harvester 22 is preferably powered by an internal combustion engine 54, which is arranged to supply power for the harvesting operation, although in some instances the power plant for the harvester could take the form of an electric motor powered by electric power supplied from a nearby ground installation. As will be noted from FIGS. 4a and 4b, the engine 54 is operatively connected to drive a hydraulic pump 56. The hydraulic pump 56 serves to supply highly pressurized fluid for driving the harvester movement drive motor 58, also depicted in this figure. The drive motor 58 is suitably connected to the wheels 59 designed to drive belt tracks 61 such that they move along the beams or rails 60.

I utilize both directions of harvester travel to vacuum harvest the algal turf, or in other words, the harvester operates bidirectionally. Directional change of the harvester as well as other adjustments in travel speed and tuning the position of vacuum pick up are done by a skilled equipment operator who adjusts controls as needed. The wheels 59 are provided with shoulders on both sides extending beyond the belt surface to the sides of the beam so as to prevent the harvester 22 from becoming derailed.

The hydraulic pump 56 also supplies highly pressurized fluid for driving the pump 48 serving to remove mature algal turf from the floway, and to deliver it to an algal turf harvest slurry transfer hose, depicted as hose reel 50; note FIG. 4a and 4b. This hose is deployed behind the first sector of a given floway, from which algal turf are harvested on the first pass of the harvester, with the hose being re-wound upon return of the harvester to its starting place in that particular floway. FIG. 1 delineates this evolution taking place in two passes along a floway, one forward and one back. Quite obviously, I am not to be limited to the utilization of a two pass, two sector floway.

With regard to the means provided by which the harvest vehicle is caused to move along the floway rails, FIG. 4a depicts fluid powered motor 58, which rotates a shaft drive system with intermittent low friction bearings to accomplish this conveyance of the harvester.

Also powered with pressurized fluid supplied from the hydraulic pump 56 are vacuum blower 46 and the vacuum pickup 40. Vacuum intake or vacuum intake plenum 40, typically of the type depicted in FIGS. 3c and 3d, is a bidirectional pickup, comprising a horizontally oriented cylinder with a slot at the bottom, although other shapes can be utilized. The intake 40 is placed such that principles of vacuum previously described can be optimized. This vacuum intake plenum device or vacuum pickup arrangement causes the algal turf to be detached and conveyed from the growing surface to the separator 44.

As to other pickup details, in the illustrated embodiment, the vacuum pickup 40 is equipped with suitable means of actuation both about the axis of the cylinder for 10–45 degrees (see FIGS. 3c and 3d) and laterally in the direction of the cylinder axis via a track and wheeled mechanism 41 so that it can be moved via hydraulic motor and chain from one side to the other side of the harvester, in order that the algal turf community on both sectors of a given floway can be harvested. I may prefer to refer to this as the relocation mechanism of the intake plenum. It is to be noted from FIG. 4a and 4b that I have utilized a ghosted location 42 in order to indicate the movement of the intake plenum or vacuum pickup 40 that is possible in accordance with this arrangement.

The cross-sectional area of the separator 44 is considerably larger than the area of the duct from the pickup 40 and this causes a drop in air velocity, which effects the separation of the liquid algal turf harvest slurry from the air previously conveying the slurry. The air continues to the vacuum blower 46 through the duct shown and is exhausted upward through the blower outlet 47. The blower 46 is visible in FIGS. 4a and 4b, and may for example be a Chicago Blower model LS 15 single inlet, self cleaning, reversed inclined, radial tip, heavyduty, vacuum blower, which is driven by a suitable hydraulic motor. There are many other manufacturers, types and sizes of suitable blowers that may be utilized on the harvester 70, and such blowers could be powered by various means.

The harvest slurry picked up by the vacuum pickup or intake plenum 40 enters the separator 44, which separates air from the algal turf harvest slurry. The slurry then falls by gravity to the cone shaped bottom 45 of the separator; note FIG. 4b. From this location the slurry is conveyed by pump 48 into the harvest slurry transfer hose stored on hose reel 50. This hose reel is configured with a swivel fitting 49 at the inlet such that it can effect transfer of algal turf harvest slurry from pump 48 during deployment and rewinding evolutions. The hose reel 50 may have an indexer 52 to ensure orderly placement of the hose on the reel, and the reel is equipped with a pressurized fluid or other means of restraint 55 from unwanted movement during flow variation of pump 48 or movement of harvest vehicle along the floway path and to wind the hose back on the reel during the return pass back to the harvest starting point at the outflow weir as previously discussed.

The end of the hose 52 is plumbed to a harvest barge 24 or to a similar storage or processing location some varying distance from the moving harvester. This collection point can optionally be equipped with a suction pump to enhance flow through the transfer hose.

With reference to FIG. 1, it may be seen that the harvest barge 24 may be operatively utilized upon outflow canal 15. The harvest barge 24 may serve many purposes, such as to contain and convey the considerably heavy algal turf harvest through buoyant means to a place of collection, and to make possible a relocation the harvester from floway to floway such that one harvester can harvest a large number of floways. Additionally, on-barge processing of algal turf such as further dewatering drying and packaging for specialized uses may be carried on in many instances. Such uses include human food, animal feed, cosmetic and pharmaceutical products or related industrial products.

A remotely powered motor via reeled cable or a motor generator set could be used in lieu of the engine hydraulic combination to drive components on the harvester.

As should now be apparent, the moving harvester 22 with onboard spool of hose can feed out hose as harvester moves along floway to collect the algal turf harvest from the growing surface. By the use of the harvester, the operator can remove mature algal turf from one half (sector A) of the width of the floway during initial travel in one direction, and then remove mature algal turf from the other half (sector B) of the floway during the return trip. As is obvious, I am not limited to a floway being divided into only two longitudinal sectors, for four or six or possibly even larger number of sectors could be utilized.

As is apparent, the hose would be fed out as the harvester moves away from the barge, and then retrieved on the return trip, as the harvester moves back toward the barge. It is undesirable for the hose to be deployed over an unharvested floway sector as this would break up and dislodge the algal turf, affecting harvest completeness.

As previously discussed, the harvesting barge serves not only to collect and store the considerably heavy harvested algal turf slurry and transport it via the outflow canal to a collective storage location, but also it is equipped with means of lifting and moving the self-powered harvester from one floway to another floway so that harvesting of algal turf can be accomplished on multiple floways by the use of only a single harvester vehicle.

Returning to a consideration of FIG. 1, it will be seen to be highly desirable in the instance of a large installation, to subdivide the algal turf farm longitudinally into multiple floways each with at least two sectors, and as previously mentioned, I am not to be limited to two longitudinal sectors. As depicted in FIG. 1, numerous floways extend at right angles to inflow canal 11, with an outflow canal 15 being disposed at the ends of these floways. As should now be clear, these individual floways can be created by the use of separating walls or curbs extending substantially the entire distance between the inflow canal 11 and the outflow canal 15.

As previously mentioned, I find it highly advantageous to greatly restrict inflow at times of harvesting the mature algal turf from a given floway 2, so that harvest water contact can be minimized during algal turf harvesting.

Quite advantageously, the arrangement illustrated in conjunction with FIG. 1 enables mature algal turf in one section to be harvested by shutting off the water thereto, while permitting the water to continue to flow through the other sector or sectors. The multisector arrangement thus makes it possible for my algal turf farm to operate on a continuous basis, with growth continuing in all the other floways during the time that the algal turf in one or more floways is being harvested in a dewatered state.

As should now be apparent, in accordance with one embodiment of this invention, the intake plenum means are movable laterally on the harvester, so as to be selectively positionable in any of several possible positions. Because the floway may be regarded as divided into a plurality of longitudinal sectors, as the harvester moves along the curbs and over the floway, mature algal turf can be harvested from a selected longitudinal sector of the floway, as determined by the lateral positioning of the intake plenum means. On the return trip, the mature algal turf can be harvested from a different longitudinal sector of the floway.

As an alternative to the foregoing embodiment, the intake plenum means may involve the use of at least two intake plenums that are disposed in laterally fixed locations on the harvester, with each intake plenum being relatable to a corresponding longitudinal sector. In order to be able to utilize relatively modest vacuum intake means, I may prefer to utilize means for selectively activating these several intake plenums, so that not all are operating at the same time. Therefore, as the harvester moves along the curbs and over the floway, mature algal turf can be harvested from each selected longitudinal sector of the floway, as determined by the position of the particular intake plenum.

When using the laterally fixed intake plenums, it may be desirable for the operator to accomplish a slight vertical repositioning of the intake plenums, depending on the particular sector being harvested at a given time. In this way the proper tolerance can be maintained between intake plenum and algal turf growing surface.

As indicated earlier, it is well known that the cleansing function provided by algal turf is assisted by having the lower algal filaments flashed with light, for this greatly assists a photosynthesis action of plant cells covered by turfs of organisms growing on top of them. To this end, I utilize a suitable means at a location adjacent the upstream weir for creating a surging action resulting in a wave that will travel the length of the inflow canal 11. As seen in FIG. 1, I may utilize an internal combustion engine for powering an axial flow pump 12 serving to maintain the water in the inflow canal 11 at a desirable level. The engine also powers a cable or cord 17 to be actuated in the general direction C-D of canal 11, said cable serving to actuate floating volumes 16, which displace water and create a wake 18 such that a surging action is created in the floway. This surging takes place in varying frequencies and magnitudes depending on the desired speciation of algal communities which is based on the filtration requirements desired.

As is obvious, the use of the axial flow pump 12, the internal combustion engine and the wave surge apparatus are illustrative, and I am not to be limited to any particular arrangement for bringing about the desired waves surging along the length of the inflow canal and consequently in the floways.

It should now be clear that I have provided an algal farm in which a plurality of floways are established, with each floway involving a growing surface of suitable texture for optimal algal turf production, located between a spaced pair of curbs, upon which algae can grow and form an algal turf. By utilizing a periodic surge of water along at least part of the floway, algal metabolism, production, and species diversity are increased, such that nutrients and pollutants contained in the water will be taken up, and particulates contained in the water trapped.

As is obvious, my invention may be carried out by components and constructions substantially different from those described herein, and I am not to be limited except as required by the scope of the appended claims.

I claim:

1. A floway for cleansing the water of a waterway containing nutrients and other pollutants, utilizing growing attached algal turf, said floway utilizing at least two elongate curbs spaced apart in a parallel relationship, a growing surface for algae disposed between said curbs, on which growing surface, selected algae are caused to grow and form means for directing water from the waterway to flow through said floway and over the algal turf, a mobile harvester for removing mature algal turf containing nutrients and pollutants assimilated and trapped by the algal turf, said harvester being of a width commensurate with the spacing of said curbs, so as to be supported therefrom, said harvester having propulsion means for causing it to move at a desired rate and in a bidirectional manner along said curbs, said harvester also containing a vacuum pickup system, said vacuum pickup system including intake plenum means mounted on said harvester, for harvesting mature algal turf after a substantial amount of the water has been removed from the floway, said intake plenum means being downwardly directed and arranged to be brought into close contact with dewatered algal turf, with ambient air also entering the intake plenum and serving to dislodge and carry the dislodged algal turf to a separator operatively mounted upon said harvester, the cross-sectional area of said separator being considerably larger than the area of the intake plenum, causing a drop in air velocity, thus aiding the separation of the algal turf from the air that had carried the algal turf, and disposal means for disposing of the harvested algal turf, without permitting it to reenter the waterway.

2. The floway as defined in claim 1 wherein said intake plenum means is movable laterally to a desired position on said harvester, such that algal turf located in different longitudinal sectors of the floway can be harvested.

3. The floway as defined in claim 1 wherein said intake plenum means includes the use of at least two laterally fixed pickup devices, such that algal turf located in different longitudinal sectors of the floway can be selectively harvested.

4. The floway for cleansing the water of a waterway containing nutrients and other pollutants as recited in claim 1 in which part of said disposal means includes a transfer pump operatively connected to the bottom of said separator, said pump receiving the discharge of algal turf from said separator, said pump having a discharge port, from which the algal turf is delivered to a place of collection.

5. The floway for cleansing the water of a waterway containing nutrients and other pollutants as recited in claim 4 in which a hose of substantial length is operatively mounted on said harvester, said hose being contained on a powered rotatable reel, with one end of said hose connected to said discharge port of said pump, and the other end of said hose serving to deliver the removed algal turf and its pollutants to a place of collection, the rotation of said reel to permit selective extension of said hose enabling said harvester to continue to deliver harvested algal turf to the place of collection, even while moving in a direction away from said place of collection.

6. A floway for cleansing the water of a waterway containing nutrients and other pollutants, utilizing growing attached algal turf, said floway utilizing at least two elongate curbs spaced apart in a parallel relationship, each of said curbs having a base portion and an upper portion, with the base portion substantially larger than the upper portion of each curb, thus as to provide good load bearing capabilities, a growing surface for algae disposed between said curbs, on which growing surface, selected algae are caused to grow and form an algal turf, said growing surface being placed in close contact with said base portion of each of said curbs, a mobile harvester device for removing mature algal turf containing nutrients and pollutants assimilated and trapped by the algal turf, said harvester being of a width commensurate with the spacing of the upper portions of said curbs, so as to be supported therefrom, power means supplying power to said harvester, said harvester having propulsion means for causing it to move at a desired rate and in a bidirectional manner along said curbs, said harvester also containing a vacuum pickup system, said vacuum pickup system including an intake plenum means positioned to move closely adjacent algal turf after the turf has been substantially dewatered, said vacuum pickup system also including a separator for separating air from the harvested algal turf, and a harvest transfer system enabling the harvested algal turf to be transferred from said separator to a place of collection, without permitting any of the algal turf to reenter the waterway.

7. The floway for cleansing the water of a waterway containing nutrients and other pollutants, utilizing growing attached algal turf as recited in claim 6 in which the upper surfaces of said curbs have a constant slope, with the slope of said curbs coinciding with the elevation of the floway, such that there is no change in dimension from curb to floway from one place to another along the floway.

8. The floway for cleansing the water of a waterway containing nutrients and other pollutants, utilizing growing attached algal turf as recited in claim 6 in which said growing surface for algae is a membrane, with the longitudinal edges of said membrane in contact with said curbs.

9. The floway for cleansing the water of a waterway containing nutrients and other pollutants, utilizing growing attached algal turf as recited in claim 8 in which said beams provide for attachment for the longitudinal sides of said membrane for algal turf growing area.

10. The floway for cleansing the water of a waterway containing nutrients and other pollutants, utilizing growing attached algal turf as recited in claim 8 in which said membrane is made of plastic.

11. The floway for cleansing the water of a waterway containing nutrients and other pollutants, utilizing growing attached algal turf as recited in claim 8 in which said membrane is a hot applied spray-on asphalt rubber combination with reinforcing and aggregate additions.

12. A floway for cleansing the water of a waterway containing nutrients and other pollutants, utilizing growing attached algal turf, said floway utilizing at least two elongate grade beams spaced apart in a parallel relationship, a growing surface for algae disposed between said curbs, on which growing surface, selected algae are caused to grow and form an algal turf, means for diverting water from the waterway, so as on occasion to cause it to flow through said floway, and in other instances, for shutting off the flow of water through the waterway, a mobile harvester device for removing mature algal turf containing pollutants and nutrients assimilated and trapped by the algal turf, said harvester being of a width commensurate with the spacing of said beams, so as to be supported therefrom, power means supplying power to said harvester, said harvester having propulsion means for causing it to move at a desired rate and in a bidirectional manner along said beams, said harvester also containing a vacuum pickup system, said vacuum system including a downwardly oriented intake plenum means mounted on said harvester at a location close to the algal turf, so that after the turf has been substantially dewatered by shutting off the flow of water through the floway, said intake plenum means can take up contacted algae, said intake plenum means connected by ducting to a separator, said separator serving to separate air from the harvested algal turf, and a harvest transfer system enabling the harvested algal turf to be transferred from said separator to a place of collection, said power means providing power for the operation of said vacuum system and said algal turf harvest transfer system, whereby as said harvester is caused to move along said beams, the functioning of said intake plenum means and said vacuum pickup system serve to harvest selected portions of the algal turf from the floway, and to deliver such harvested algal turf to said separator, said algal turf harvest transfer system serving to remove the collected algae from the bottom of the separator, and to transfer such algal turf to a place of collection, without permitting any of the algal turf to reenter the waterway.

13. A floway for cleansing the water of a waterway as recited in claim 12 in which said power means is an engine carried on said harvester.

14. A floway for cleansing the water of a waterway as recited in claim 12 which said power means is an electric motor supplied with power from a remote source.

15. A floway for cleaning the water of a waterway as recited in claim 12 in which said harvester is equipped with wheels, enabling it to roll along said beams in a selected direction.

16. The floway as defined in claim 12 wherein said intake plenum means is movable laterally to a desired position on said harvester, such that mature algal turf located in different longitudinal sectors of the floway can be harvested.

17. The floway as defined in claim 12 wherein said intake plenum means includes the use of at least two laterally fixed pickup devices, such that mature algal turf located in different longitudinal sectors of the floway can be selectively harvested.

18. A floway for cleansing the water of a waterway as recited in claim 12 in which said harvest transfer system utilizes a hose of substantial length contained on a powered rotatable reel located on said harvester, and a harvest transfer pump connected to the bottom of said separator, one end of said hose being connected to receive the discharge of algal turf from said pump, and the other end of said hose serving to deliver the removed algal turf and its pollutants to the place of collection, the rotation of said reel to permit extension of said hose enabling said harvester to continue to deliver harvested algal turf to the place of collection, even while moving in a direction away from said place of collection.

19. A floway for cleansing the water of a waterway as recited in claim 12 in which said intake plenum is configured to operate within a few inches of the growing algal turf, even as said harvester is moving along said beams.

20. A floway for cleansing the water of a waterway as recited in claim 12 in which said intake plenum includes a relocation mechanism, said relocation mechanism enabling said intake plenum means to be moved from one location on the harvester to another, whereby said harvester can remove mature algal turf from one sector of the floway during movement along said beams of said floway in one direction, and thereafter remove mature algal turf from another sector of the floway when the harvester is moving in the opposite direction.

21. The floway for cleansing the water of a waterway containing nutrients and other pollutants as recited in claim 12 in which said harvest transfer system includes a transfer pump operatively connected to the bottom of said separator, said pump receiving the discharge of algal turf from said separator, said pump having a discharge port, from which the algal turf is delivered to a place of collection.

22. The floway for cleansing the water of a waterway containing nutrients and other pollutants as recited in claim 21 in which a hose of substantial length is operatively mounted on said harvester, said hose being contained on a powered rotatable reel, with one end of said hose connected to said discharge port of said pump, and the other end of said hose serving to deliver the removed algal turf and its pollutants to a place of collection, the rotation of said reel to permit selective extension of said hose enabling said harvester to continue to deliver harvested algal turf to the place of collection, even while moving in a direction away from said place of collection.

23. An algal farm established for the purification of the water of a waterway by natural means, said farm having at least one floway defined by a pair of elongate curbs disposed in a substantially parallel, spaced apart relationship and defining an inlet end as well as an outlet end, each of said curbs having a base portion and an upper portion, with the base portion substantially larger than the upper portion of each curb, thus to provide grade beam stability in low soil capacity sites, means for diverting water from the waterway, so as on occasion to cause it to enter said inlet end of said floway, and to exit from the outlet end, means defining a growing surface for algae disposed between said curbs, on which growing surface, selected algae are caused to grow and form an algal turf able to bring about bioassimilation of nutrients and pollutants, as well as the physical trapping of particulates contained in water caused to flow over the algal turf, water diverted from the waterway from a waterway, and causing it to enter said inlet end of said flowing the length of said floway, in close contact with the algal turf growing on said growing surface, with the water thus purified then returning via said outlet end of said floway to the waterway, and a wheeled harvester spanning said floway, with its wheels in contact with, and supported by, said curbs, means for shutting off the flow of water entering the inlet end of said floway on occasion, so as to bring about a dewatering of the algae, intake plenum means supported on a lower portion of said harvester, so as to be in close contact with dewatered algae, said intake plenum means being connected to a source of vacuum, whereby mature algae can be harvested from said growing surface, as said harvester moves along said floway.

24. The algal farm as recited in claim 23 in which said intake plenum means is movable laterally on said harvester, so as to be positionable in selected positions, and said floway may be regarded as divided into at least two longitudinal sectors, whereby as said harvester moves along said floway, algae can be harvested from a selected longitudinal sector of said floway, as determined by the positioning of said intake plenum.

25. The algal farm as recited in claim 23 in which said harvester is movable bidirectionally along said curbs, and said intake plenum is movable laterally on said harvester, between selected positions, and said floway may be regarded as divided into at least two longitudinal sectors, whereby as said harvester moves in one direction along said floway, said intake plenum can be positioned on said harvester such that algal turf can be harvested from a first selected sector of said floway, and when said harvester moves in the opposite direction along said floway, said intake plenum can be positioned on said harvester such that algal turf can be harvested from another selected sector of said floway.

26. The algal farm as recited in claim 23 in which said harvester carries a vacuum source as well as a means for receiving the harvested algal turf, and separating means also located on said harvester, said separating means serving to remove excess water from the harvested algal turf.

27. The algal farm as recited in claim 26 in which a power source is carried by said harvester, said power source furnishing the power needed for the operation of said vacuum source.

28. The algal farm as recited in claim 23 in which a plurality of floways are utilized, with said floways being crossed by a canal, in which canal a barge is operatively disposed, said barge being selectively positionable in alignment with each of said floways, said barge being able to receive said harvester at the end of one floway, and then move it to another floway, so that said harvester can then be used in harvesting the algal turf in the latter floway.

29. The algal farm as recited in claim 28 in which said barge can also receive and store algal turf harvested by said harvester.

30. The algal farm established for the purification of the water of a waterway by natural means as recited in claim 22, further comprising means for delivering algae taken up by said intake plenum means to a separator serving to eliminate a substantial quantity of the water harvested with the algae.

31. The algal farm established for the purification of the water of a waterway by natural means as recited in claim 30 in which a transfer pump is operatively connected to the bottom of said separator, said pump receiving the discharge of algae from said separator, said pump having a discharge port, from which the harvested algae is delivered to a place of collection.

32. The algal farm established for the purification of the water of a waterway by natural means as recited in claim 31 in which a hose of substantial length is operatively mounted on said harvester, said hose being contained on a powered rotatable reel, with one end of said hose connected to said discharge port of said pump, and the other end of said hose serving to deliver the removed algal turf and its pollutants to a place of collection, the rotation of said reel to permit selective extension of said hose enabling said harvester to continue to deliver harvested algal turf to the place of collection, even while moving in a direction away from said place of collection.

33. An algal farm established for the purification of flowing water and the generation of an algal turf, such purification being accomplished by natural means, said farm having at least one floway, each floway being defined by a pair of elongate curbs disposed in a substantially parallel, spaced apart relationship, and having an inlet end as well as an outlet end;

a growing surface for algae disposed between said curbs, on which growing surface, selected algae are caused to grow and form an algal turf;

means for diverting water from a waterway, and causing it to enter said inlet end of said floway, such water then flowing the length of said floway under the influence of gravity, in close contact with the algal turf growing on said growing surface, such that nutrients and pollutants can be bioassimilated by the action of the algal turf, with particulates in the water being trapped by the algal turf, the purified water then returning to the waterway via said outlet end of said floway;

means for shutting off the flow of water through said floway, so as to bring about a dewatering of the algal turf, and a wheeled harvester spanning said floway, with its wheels in contact with, and supported by, said curbs, such that said harvester may move along said floway;

intake plenum means located on a lower portion of said harvester, which intake plenum means is supported in a closely spaced relationship to dewatered algal turf growing in said floway, said intake plenum means being connected to a source of vacuum, whereby mature algal turf can be harvested from the growing surface, as said harvester moves along said floway, and means for delivering harvested algal turf to a remote collection location.

34. The algal farm as recited in claim 33 in which said intake plenum means are movable laterally on said harvester, so as to be selectively positionable in any of several possible positions, said floway being regarded as divided into a plurality of longitudinal sectors, whereby as said harvester moves along said curbs and over said floway, mature algal turf can be harvested from a selected longitudinal sector of said floway, as determined by the lateral positioning of said intake plenum means.

35. The algal farm as recited in claim 33 in which said harvester is movable bidirectionally along said curbs, and said intake plenum means is movable laterally on said harvester, between a plurality of operable positions, and said floway may be regarded as divided into a plurality of longitudinal sectors, whereby as said harvester moves in one direction along said floway, said intake plenum means can be positioned on said harvester such that algal turf can be harvested from a first selected sector of said floway, and when said harvester moves in the opposite direction along said floway, said intake plenum means can be positioned on said harvester such that algal turf can be harvested from another selected sector of said floway.

36. The algal farm as recited in claim 33 in which said intake plenum means involves the use of at least two intake plenums that are disposed in laterally fixed locations on said harvester, said floway being regarded as divided into a plurality of longitudinal sectors, with each intake plenum being relatable to a corresponding longitudinal sector, whereby as said harvester moves along said curbs and over said floway, mature algal turf can be harvested from each selected longitudinal sector of said floway, as determined by the position of the particular intake plenum.

37. The algal farm as recited in claim 33 in which said harvester carries a vacuum source as well as a harvest transfer pump means, means for temporarily receiving and separating the harvested algal turf from the air used to transport the algal turf, such air then continuing to the vacuum source, and such harvested algal turf dropping to the intake of said transfer pump means.

38. The algal farm as recited in claim 37 in which a power source is carried by said harvester, said power source furnishing the power needed for the operation of said vacuum source and said harvest transfer pump means, and a deployable hose for conveying the harvested algal turf to a place of collection.

39. The algal farm as recited in claim 33 in which a plurality of parallel floways are utilized, with said floways being crossed by a canal, in which canal a barge is operatively disposed, said barge being selectively positionable in alignment with each of said floways, said barge being able to receive said harvester at the end of one floway, and then move it to another floway, so that said harvester can then be used in harvesting the algal turf in the latter floway.

40. The algal farm as recited in claim 39 in which said barge can also receive and store algal turf harvested by said harvester and conveyed by a transfer pump through a deployable hose to a place of collection on the barge.

41. The algal farm established for the purification of flowing water and the generation of an algal turf as recited in claim 33, further comprising a transfer pump operatively connected to a bottom of said separator, said pump for receiving a discharge of algal turf from said separator, said pump having a discharge port for delivering the harvested algal turf to the remote collection location.

42. The algal farm established for the purification of flowing water and the generation of an algal turf as recited in claim 41 in which a transfer pump is operatively connected to the bottom of said separator, said pump receiving the discharge of algal turf from said separator, said pump having a discharge port, from which the harvested algal turf is delivered to the remote collection location.

43. The algal farm established for the purification of flowing water and the generation of an algal turf as recited in claim 42 in which a hose of substantial length is operatively mounted on said harvester, said hose being contained on a powered rotatable reel, with one end of said hose connected to said discharge port of said pump, and the other end of said hose serving to deliver the removed algal turf and its pollutants to the remote collection location, the rotation of said reel to permit selective extension of said hose enabling said harvester to continue to deliver harvested algal turf to the collection location, even while moving in a direction away from the collection location.

* * * * *